(12) United States Patent
Ueno et al.

(10) Patent No.: US 7,810,947 B2
(45) Date of Patent: Oct. 12, 2010

(54) WHITE LED LIGHT SOURCE DEVICE AND LED BACKLIGHT USING THE SAME

(75) Inventors: Kazuhiko Ueno, Tokyo (JP); Nobuyuki Kobayashi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 313 days.

(21) Appl. No.: 11/950,100

(22) Filed: Dec. 4, 2007

(65) Prior Publication Data
US 2008/0151527 A1 Jun. 26, 2008

(30) Foreign Application Priority Data
Dec. 4, 2006 (JP) ................ 2006-327144

(51) Int. Cl.
*F21V 9/00* (2006.01)
(52) U.S. Cl. .............. 362/231; 362/84; 362/97.1; 362/612; 257/98
(58) Field of Classification Search ........... 362/231, 362/240, 545, 84, 97.1, 97.3, 97.4; 313/501, 313/486, 502; 257/88, 89, 91, 100
See application file for complete search history.

(56) References Cited

U.S. PATENT DOCUMENTS

| | | | | |
|---|---|---|---|---|
| 6,149,283 A * | 11/2000 | Conway et al. | ............ | 362/236 |
| 6,686,691 B1 * | 2/2004 | Mueller et al. | ............. | 313/503 |
| 6,834,981 B2 | 12/2004 | Nagai et al. | | |
| 7,497,590 B2 * | 3/2009 | Rains et al. | ................ | 362/231 |
| 7,554,129 B2 * | 6/2009 | Roth et al. | ................. | 257/100 |
| 2002/0006040 A1 * | 1/2002 | Kamada et al. | ............. | 362/237 |
| 2005/0093442 A1 * | 5/2005 | Setlur et al. | ................ | 313/512 |
| 2008/0157103 A1 * | 7/2008 | Chandra | ...................... | 257/88 |
| 2008/0185602 A1 * | 8/2008 | Park et al. | ..................... | 257/98 |
| 2008/0265269 A1 * | 10/2008 | Yoo et al. | ...................... | 257/98 |
| 2008/0304250 A1 * | 12/2008 | Harbers et al. | ............... | 362/84 |
| 2008/0316741 A1 * | 12/2008 | Lee | ........................... | 362/231 |

FOREIGN PATENT DOCUMENTS

| | | |
|---|---|---|
| JP | 2927279 | 5/1999 |
| JP | 2002060747 | 2/2002 |
| JP | 2003100108 | 4/2003 |

\* cited by examiner

*Primary Examiner*—Ali Alavi
(74) *Attorney, Agent, or Firm*—Keneally Vaidya LLP

(57) ABSTRACT

A white LED light source device and an LED backlight using the white LED light source can produce, among other features, white light with sufficient luminous intensity, uniform color tone, and high luminous utilization efficiency. A light path for producing white light with favorable color mixture can be shortened. The white LED light source device can be configured to include a bluish green LED lamp which can emit bluish green light by the combination of a blue LED device and a green phosphor material and a purple LED lamp which can emit purple light by the combination of a blue LED device and a red phosphor material. The bluish green light from the bluish green LED lamp and the purple light from the purple LED lamp are subjected to additive color mixture to produce white light with a spectrum containing three primary color wavelength components.

20 Claims, 12 Drawing Sheets

WHITE LED LIGHT SOURCE DEVICE AND LED BACKLIGHT USING THE SAME

This application claims the priority benefit under 35 U.S.C. §119 of Japanese Patent Application No. 2006-327144 filed on Dec. 4, 2006, which is hereby incorporated in its entirety by reference.

BACKGROUND

1. Technical Field

The presently disclosed subject matter relates to a white LED light source device and an LED backlight using the same. In particular, the disclosed subject matter relates to a white LED light source device and an LED backlight using the white LED light source device which can emit white light having a spectrum containing three primary color wavelength components of red, green, and blue light by additive color mixture of light emitted from two different LED lamps with different color tones.

2. Description of the Related Art

A semiconductor light-emitting device (for example, LED device) can emit light with a sharp spectrum, which can be recognized by human beings as light with color tone corresponding to a peak wavelength $\lambda p$ (being the wavelength having a maximum luminous intensity). Namely, the light emitted from such a light-emitting device is not white light (natural light) including wavelengths in a range from ultraviolet to infrared wavelength and including the visible range, like sunlight. Instead, the light is a particular tone light intrinsic to the LED device in accordance with the LED devices' material, composition, structure, and the like.

Heretofore, several methods have been proposed to obtain white light using LED devices as a light source. One example of such methods is to utilize a phosphor material, or a wavelength conversion material, with an LED device. This method can use a principle in that a phosphor material is irradiated with light to be excited to thereby emit light which has a longer wavelength than that of the excitation light.

For example, a yellow phosphor material is excited by blue light (being light having a peak wavelength in the wavelength region of blue color), thereby wavelength-converting the blue light into complementary colored light, being yellow light or yellowish green light. Accordingly, when using a blue LED device and a yellow phosphor material, part of blue light emitted from the LED device can excite the yellow phosphor material to allow the phosphor material to emit yellow or yellowish green light. The resulting yellow or yellowish green light is combined with the rest of the blue light from the blue LED device for additive color mixing, thereby generating white light (see, for example, the conventional art disclosed in Japanese Patent No. 2927279).

Another conventional method utilizes two different phosphor materials including a green phosphor material, which can be excited by blue light to wavelength-convert the blue light to green light, and a red phosphor material, which can be excited by the blue light to wavelength-convert it to red light. Namely, in this instance, part of blue light emitted from the blue LED device can excite the green phosphor material to allow it to emit green light. Furthermore, part of blue light emitted from the blue LED device can excite the red phosphor material to allow it to emit red light. The resulting green light and red light are mixed with the rest of the blue light for additive color mixing, thereby generating white light (see, for example, the conventional art disclosed in Japanese Patent Application Laid-Open No. 2002-060747 and corresponding U.S. Pat. No. 6,686,691B1).

Some methods have been proposed in which phosphor materials are not used. In one such method, a red LED device which can emit red light, a green LED device which can emit green light, and a blue LED device which can emit blue light are used to simultaneously emit three colored light. By separately controlling the intensities of the red light, green light, and blue light from the respective LED devices, a white light having a desired tone can be generated by additive color mixing (see, for example, the conventional art disclosed in Japanese Patent Application Laid-Open No. 2003-100108 and corresponding U.S. Pat. No. 6,834,981B2).

In the conventional techniques described above, the method for generating white light by the combination of the blue LED device and the yellow phosphor material can provide a high utilization efficiency of blue light from the LED device as well as a luminous efficiency nearly equal to that of a common cold cathode fluorescent lamp. However, the produced white light may contain only limited amounts of red and green wavelength components, and therefore, is pseudo white light. When a light source device utilizing such a method is applied as a light source for an LCD backlight, the color reproduction characteristics of the LCD may deteriorate (for example, in the case as shown in FIG. 1).

The method for obtaining white light by the combination of a blue LED device with green and red phosphor materials can produce light containing three primary color wavelength components of blue light, green light, and red light. Accordingly, when this method is adopted as a light source for an LCD backlight, a wide range of color reproduction characteristics for the LCD can be ensured. Furthermore, since the light source includes only one type of LED device, e.g., a blue LED device, wavelength shift due to generated heat or change over time may be reduced. This can prevent the color tone of produced white light from varying. In this instance, however, green light emitted from the green phosphor material may be absorbed (re-wavelength-converted) by the red phosphor material. As a result of this, blue light from the blue LED device may not be effectively utilized and its utilization efficiency as well as luminous efficiency may deteriorate (for example, the case as shown in FIG. 2).

The method for producing white light by the combination of three primary colored LED devices, or red, green, and blue LED devices, can achieve a wide range of color reproduction characteristics, and over 100% in terms of NTSC ratio. In this instance, the respective LED devices may be formed of different materials and compositions. For example, the red LED device may be made of an AlGaInP-based material whereas the blue and green LED devices may be made of an InGaN-based material. Accordingly, each LED device has inherent temperature characteristics and deterioration characteristics. This means that the wavelength shift due to generated heat and change over time may be varied device to device, and the color tone variation of produced white light may become remarkable. Specifically, the luminous efficiency of the red LED device may deteriorate due to temperature rise with time, and therefore, the color tone of produced white light may be shifted toward blue. In addition to this, service life of the red LED device is shorter than other LED devices, and therefore, the color component thereof may be reduced with time, thereby shifting the color tone of produced white light toward blue.

By the way, when three primary colored LED lamps are used to produce white light with favorable color mixture, the lamps must be well designed in terms of arrangement, pitch therebetween, distance between both the light emitting surfaces and the surface to be irradiated, and other factors. Accordingly, if a certain distance is required or desired from the light emitting surface of the LED lamps to a surface to be irradiated as a light path to ensure optical performance, miniaturization and thinning of the apparatus incorporating the LED lamps may be hampered. When three types of LED lamps (including a red LED lamp, a green LED lamp, and a blue LED lamp) are arranged in line to produce white light with sufficient luminous intensity and uniform color tone for use as a light source of an LCD backlight, for example, it may be required to satisfy the condition of $L \geq P \times 1.5$ wherein L is the distance between the light emitting surfaces of the LED lamps and the surface to be irradiated, and P is the pitch between adjacent LED lamps (see, for example, the configuration as shown in FIG. 3, which will be described later).

SUMMARY

In view of the conventional characteristics, features, and problems described above, as well as other characteristics, features, problems, and considerations in the art, the presently disclosed subject matter has been devised. According to an aspect of the presently disclosed subject matter, an LED backlight can have a white LED light source device which can produce white light containing three primary color wavelength components of blue light, green light, and red light based on blue light emitted from a blue LED device. Namely, the LED backlight may have a white LED light source which has a high utilization efficiency of blue light from the blue LED device. The LED backlight can provide a shorter light path from each light emitting surface of each LED lamp for producing white light with favorable color mixture. The LED backlight can also provide consistent luminous intensity and color tone for the produced white light with less effect by heat and less change over time.

A white LED light source device according to another aspect of the presently disclosed subject matter can include at least one bluish green LED lamp which can emit bluish green light and at least one purple LED lamp which can emit purple light, wherein the bluish green light and the purple light are subjected to color mixture to produce white light that has a spectrum containing three primary color wavelength components of red, green, and blue light.

The bluish green LED lamp can include a blue LED device which can emit blue light having a peak wavelength in a wavelength range of blue color and a green wavelength conversion material which can be excited by the blue light to emit green light having a peak wavelength in a wavelength range of green color.

The purple LED lamp can include a blue LED device which can emit blue light having a peak wavelength in a wavelength range of blue color and a red wavelength conversion material which can be excited by the blue light to emit red light having a peak wavelength in a wavelength range of red color.

The wavelength conversion material may be a phosphor material with a corresponding color.

An LED backlight according to another aspect of the presently disclosed subject matter can include the white LED light source device described above.

Another example of a white LED light source made in accordance with principles of the presently disclosed subject matter can emit bluish green light that has been wavelength-converted by the excitation of the green phosphor material irradiated with blue light from the blue LED device. The resulting bluish green light is not absorbed (re-wavelength conversion) by the red phosphor material, thereby improving the utilization efficiency of blue light from the blue LED device.

An exemplary white LED light source in accordance with the presently disclosed subject matter can produce white light containing red, green, and blue wavelength components, or three primary colors, in its spectrum. Accordingly, when it is used as a light source for an LED backlight or a projector, a wider range of color reproduction characteristics can be ensured when compared to white light produced by the combination of a blue LED device and a yellow phosphor material.

In this configuration, the light path from the light emitting surfaces of the LED lamps to the surface to be irradiated can be shortened while also being configured to produce white light with favorable color mixture and uniform color tone. Accordingly, miniaturization of the apparatus can be achieved.

The typical blue LED device may not be substantially affected by the ambient temperature, and the output thereof may not deteriorate so much with cumulative light-up time. In one example of a white LED light source device made in accordance with principles of the presently disclosed subject matter, both the bluish green LED lamp and the purple LED lamp can use only or substantially only blue LED devices as a light-emitting body. Accordingly, the resulting white LED light source device can produce white light with a luminous intensity and color tone less affected by the ambient temperature and cumulative light-up time.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

Figure 1:
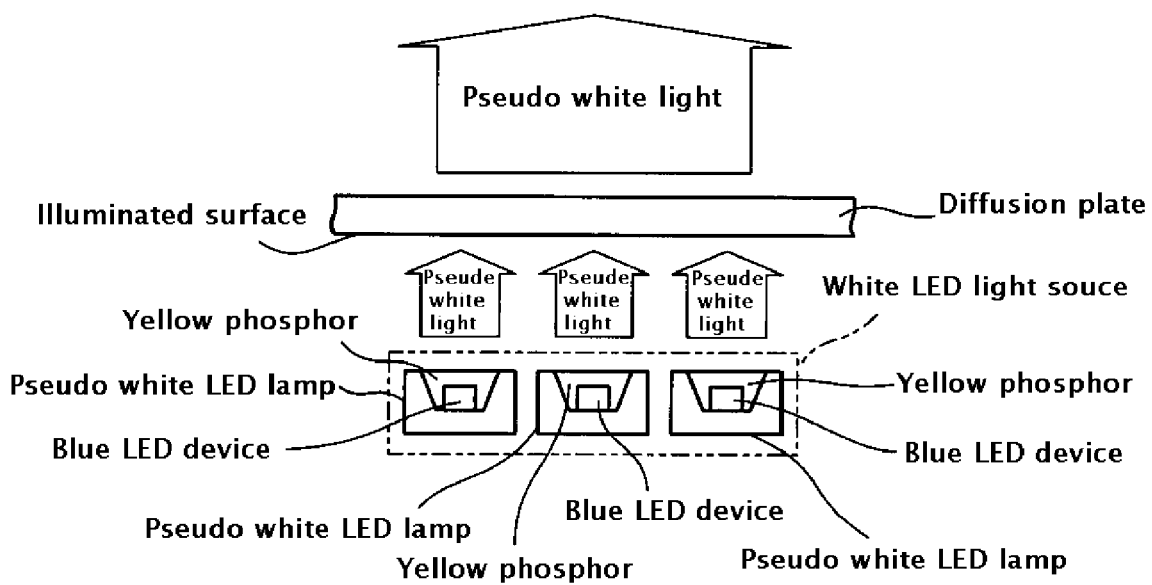
FIG. 1 is a schematic view showing the configuration of a conventional white LED light source device.
Figure 2:
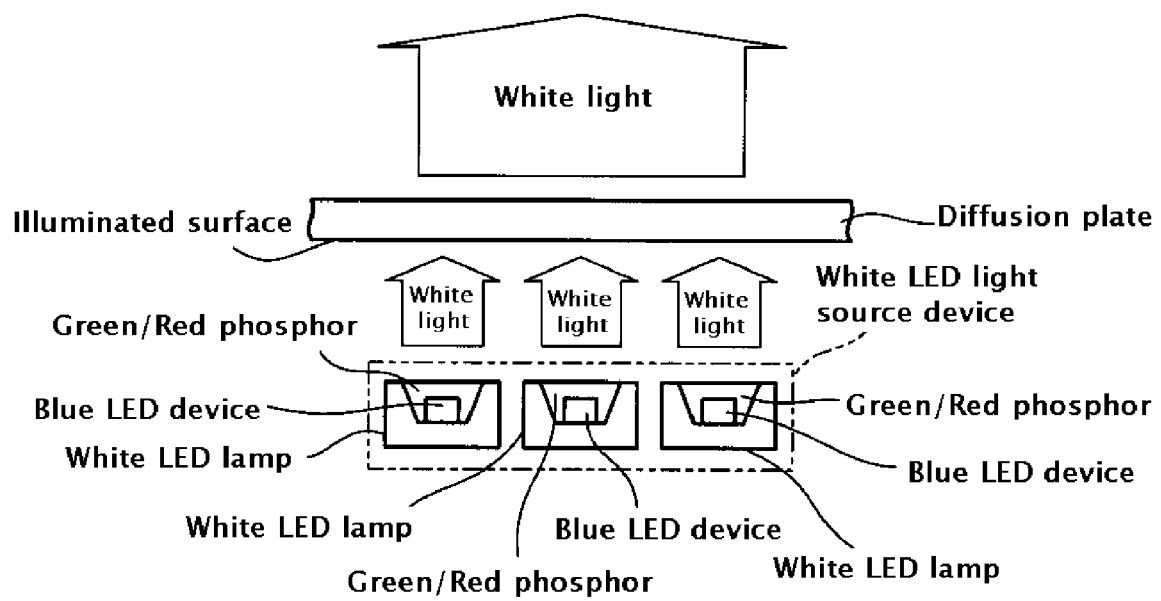
FIG. 2 is a schematic view showing the configuration of another conventional white LED light source device.
Figure 3:
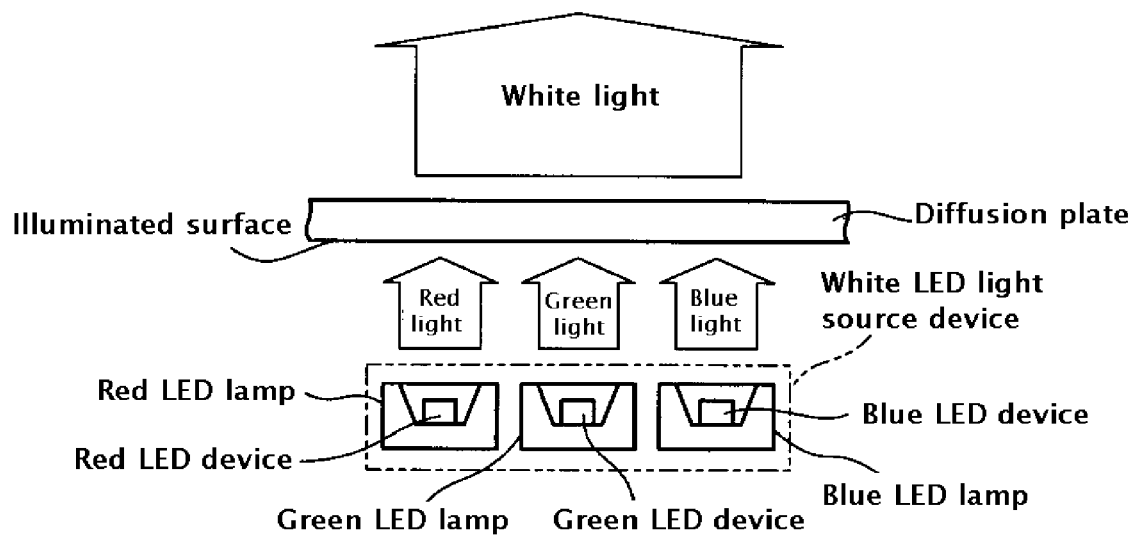
FIG. 3 is a schematic view showing the configuration of still another conventional white LED light source device for use in an LED backlight.

Hereinafter, exemplary embodiments in accordance with the presently disclosed subject matter will be described with reference to the accompanying drawings of FIGS. 4 through 12 and FIGS. 14-17. The same or similar components appearing in each of the drawing Figures may be denoted by the same reference numerals/symbols.

Figure 4:
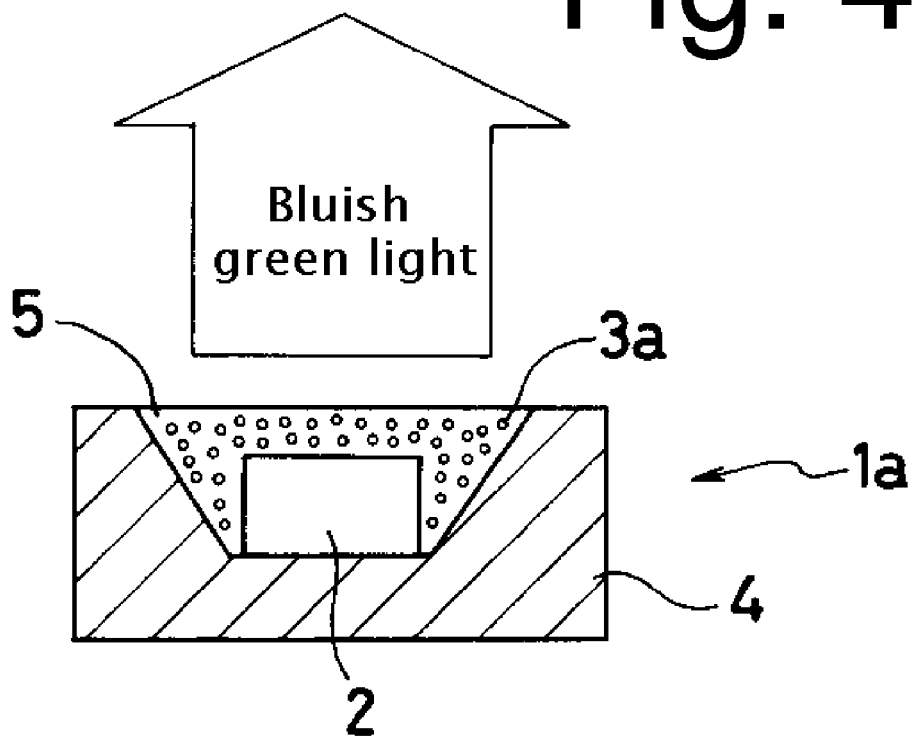
FIG. 4 is a cross-sectional view showing an example of an LED lamp constituting a white LED light source device made in accordance with principles of the presently disclosed subject matter.
Figure 5:
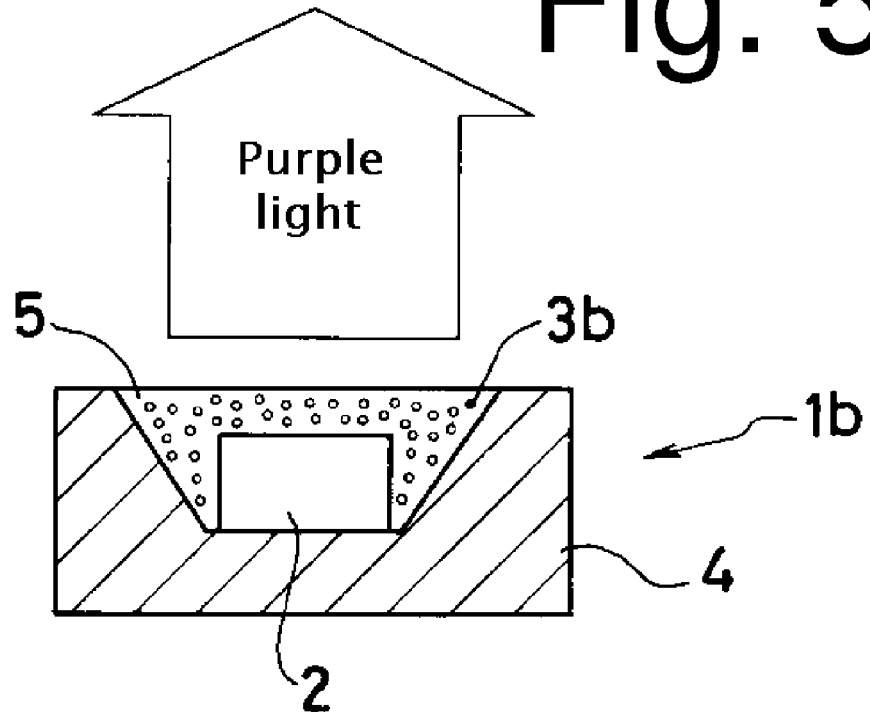
FIG. 5 is a cross-sectional view showing another example of an LED lamp constituting a white LED light source device made in accordance with principles of the presently disclosed subject matter.

One example of a white LED light source device made in accordance with principles of the presently disclosed subject matter can include a bluish green LED lamp and a purple LED lamp. FIG. 4 is a cross-sectional view illustrating an example of a bluish green LED lamp. FIG. 5 is a cross-sectional view illustrating an example of a purple LED lamp.

As shown in FIG. 4, the bluish green LED lamp 1a can include a lamp housing 4 and a bare LED chip (hereinafter, referred to as an LED device) 2 mounted on the housing 4 as a light-emitting body.

In this instance, the LED device 2 can be a blue LED device which can emit blue light (light having a peak wavelength in the wavelength range of blue color). The blue LED device 2 can be sealed with a sealing resin 2 so as to be entirely covered therewith. The sealing resin 5 can include a transparent resin and a phosphor material serving as a wavelength conversion material dispersed in the transparent resin.

The phosphor material may be formed of ZnS:Cu, SiAlO-N:Eu, and/or $Ca_3Sc_2(SiO_4)_3$:Ce. The phosphor material in the exemplary embodiment of FIG. 7 can be a green phosphor material 3a which can be excited by the blue light emitted from the blue LED device 2 and emit green light which has been wavelength-converted.

Figure 7:
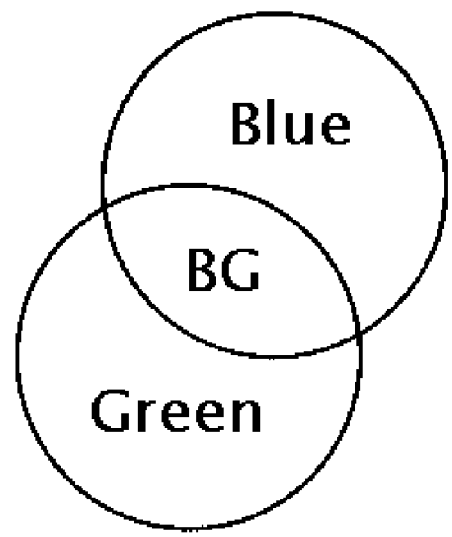
FIG. 7 is a conceptual diagram illustrating additive color mixture in a typical LED lamp.

As shown in FIG. 7, the bluish green LED lamp 1a can emit a portion of the blue light emitted from the blue LED device 2 in combination with green light which is light that has been wavelength-converted by the green phosphor material 3a after being excited by another portion of the blue light from the blue LED device 2, for additive color mixture, thereby emitting a resulting bluish green light.

In FIG. 5, as in the bluish green LED lamp 1a, the purple LED lamp 1b can include a lamp housing 4 and a blue LED device 2 mounted on the housing 4 as a light-emitting body.

Figure 8:
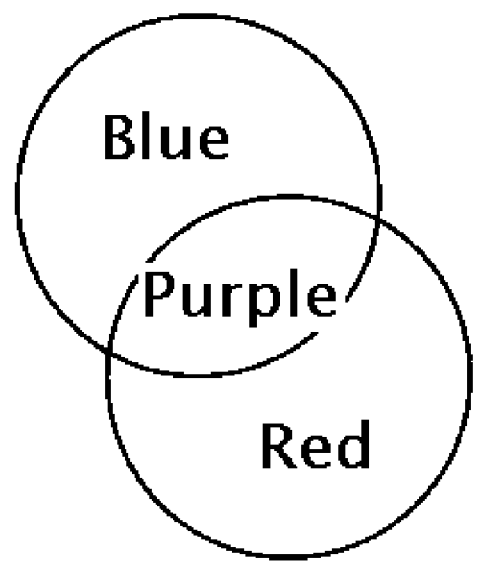
FIG. 8 is a conceptual diagram illustrating additive color mixture in another typical LED lamp.

In this example, the purple LED lamp 1b is different from the bluish green LED lamp 1a in that the sealing resin 5 includes a transparent resin and a red phosphor material 3b made of $CaAlSiN_3$:Eu, serving as a wavelength conversion material dispersed in the transparent resin. As shown in FIG. 8, the purple LED lamp 1b can emit a portion of the blue light emitted from the blue LED device 2 in combination with red light which is light that has been wavelength-converted by the red phosphor material 3b after being excited by another portion of the blue light emitted from the blue LED device 2, for additive color mixture, thereby emitting a resulting purple light.

It should be appreciated that electrodes of the LED devices, electrode patterns formed in the lamp housings for feeding electrical power to the LED devices, bonding wires for connecting the electrodes of the LED devices and the electrode patterns in the housings, and similar elements are omitted in the drawings in order to facilitate the understanding of the disclosed subject matter.

Figure 6:
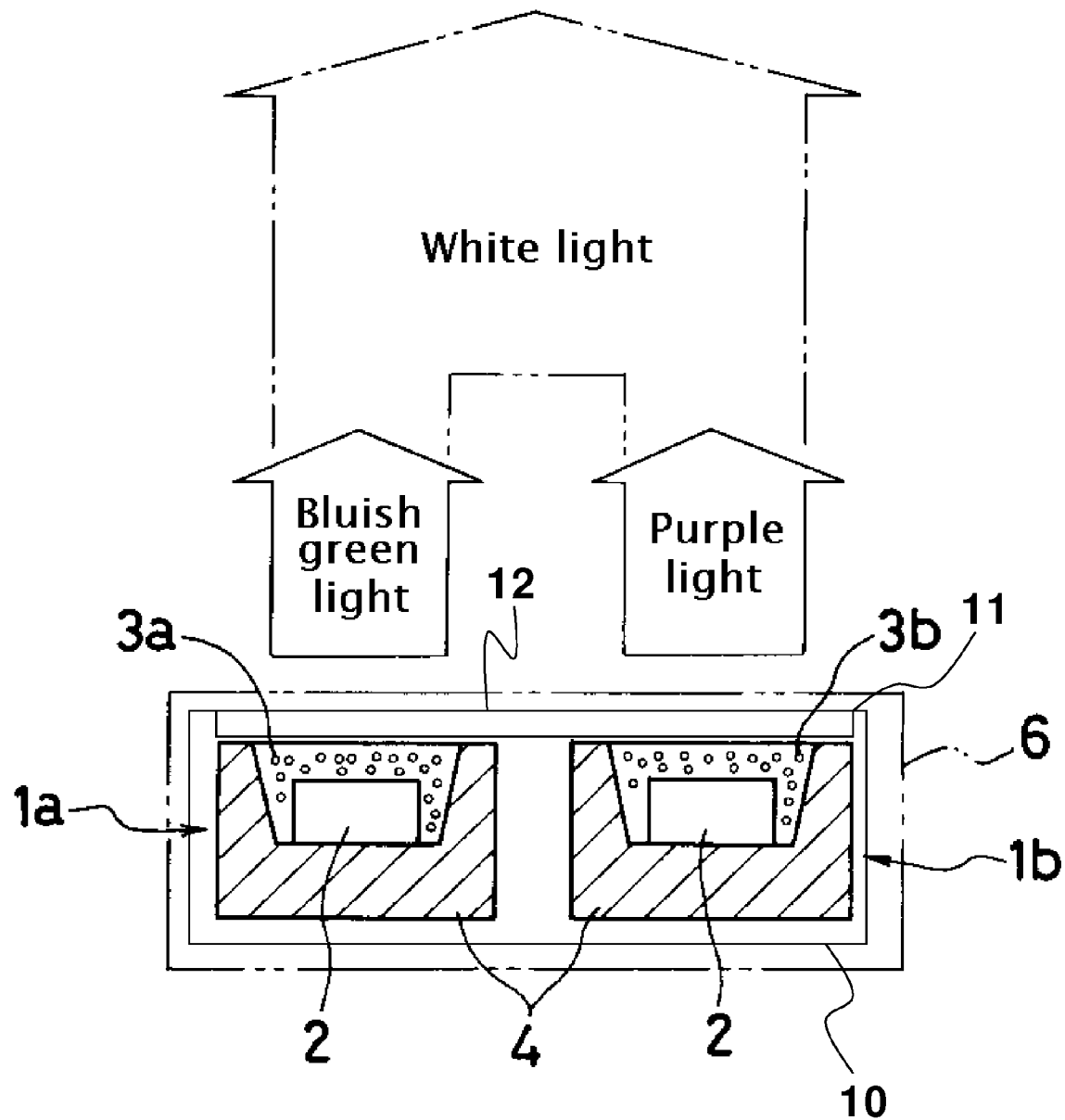
FIG. 6 is a cross-sectional view showing an example of a white LED light source device made in accordance with principles of the presently disclosed subject matter.

The white LED light source device 6 as shown in FIG. 6 can be formed by combining the bluish green LED lamp 1a and the purple LED lamp 1b, both configured as described above, into a housing 10. The bluish green LED lamp 1a and the purple LED lamp 1b are configured to emit light in a same, substantially parallel direction with respect to each other, through a window 11 in the housing 10. The emitted light can be mixed before or after passing through the window 11 in the housing. A lens structure 12 can be located in the window of the housing 10. The lens structure 12 can be optically active to change the direction or other characteristic (e.g., diffusion, focus, direction, mixture of respective light, etc.) of the light emitted from each of the bluish green LED lamp 1a and the purple LED lamp 1b. It should be understood that the housing is not necessarily a one piece structure but, for example, could be made up of a wiring board and the casing of an electronics device such as a computer, etc. In addition, the window in the housing can be defined by several different structures, provided light can pass through the area designated to be the "window" and then irradiate an intended structure (e.g., diffusion plate, guide plate, etc.)

Figure 9:
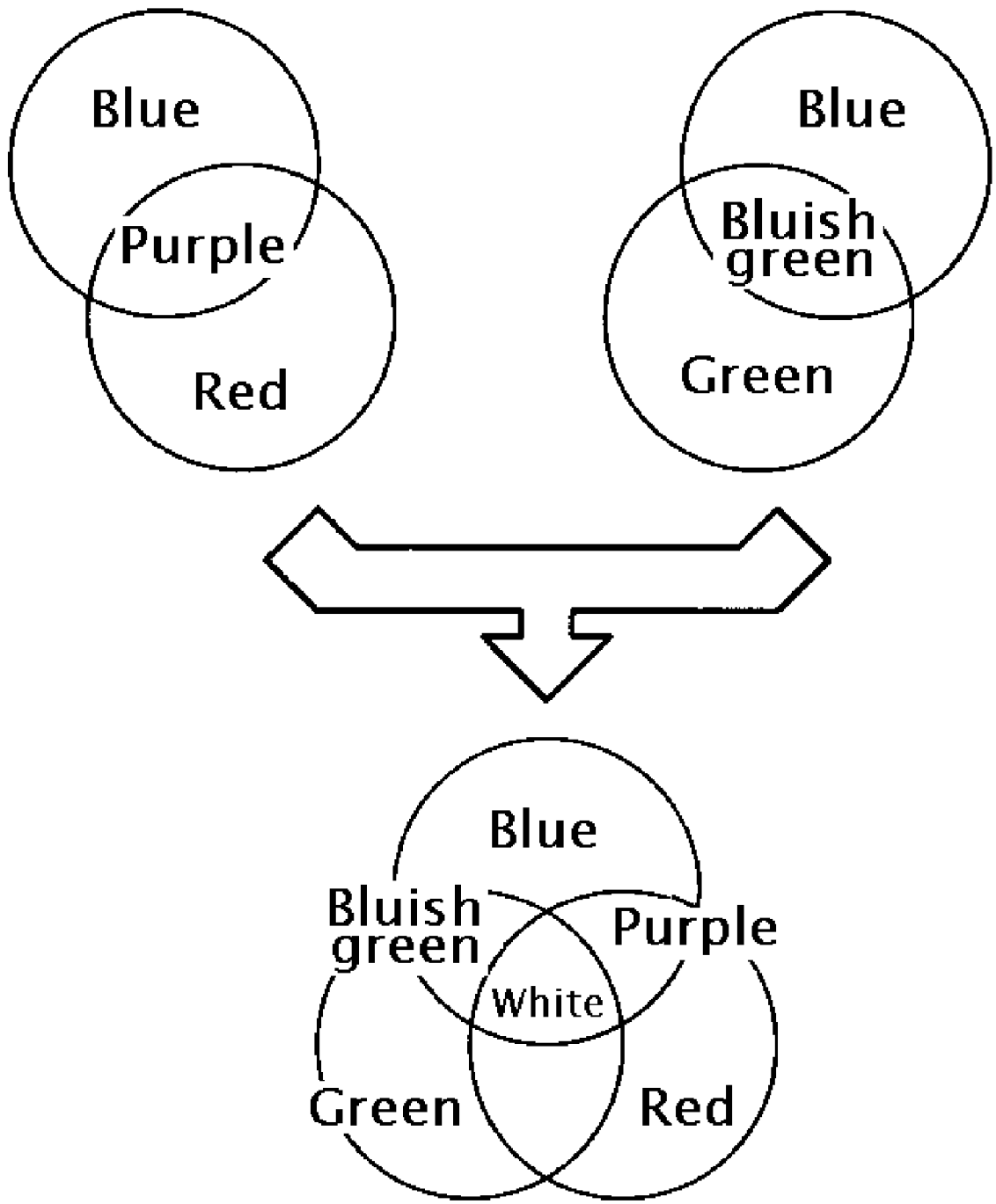
FIG. 9 is a conceptual diagram illustrating an example of additive color mixture for a white LED light source device made in accordance with principles of the presently disclosed subject matter.

When the bluish green LED lamp 1a and the purple LED lamp 1b are simultaneously turned on, the bluish green LED lamp 1a can emit bluish green light by the additive mixture of green light and blue light, and the purple LED lamp 1b can emit purple light by the additive mixture of red light and blue light. The bluish green light and purple light can be subjected to additive color mixture as shown in FIG. 9 to produce white light.

As a result, the white LED light source device 6 can produce white light containing red, green, and blue wavelength components, or three primary colors, in its spectrum.

Figure 10:
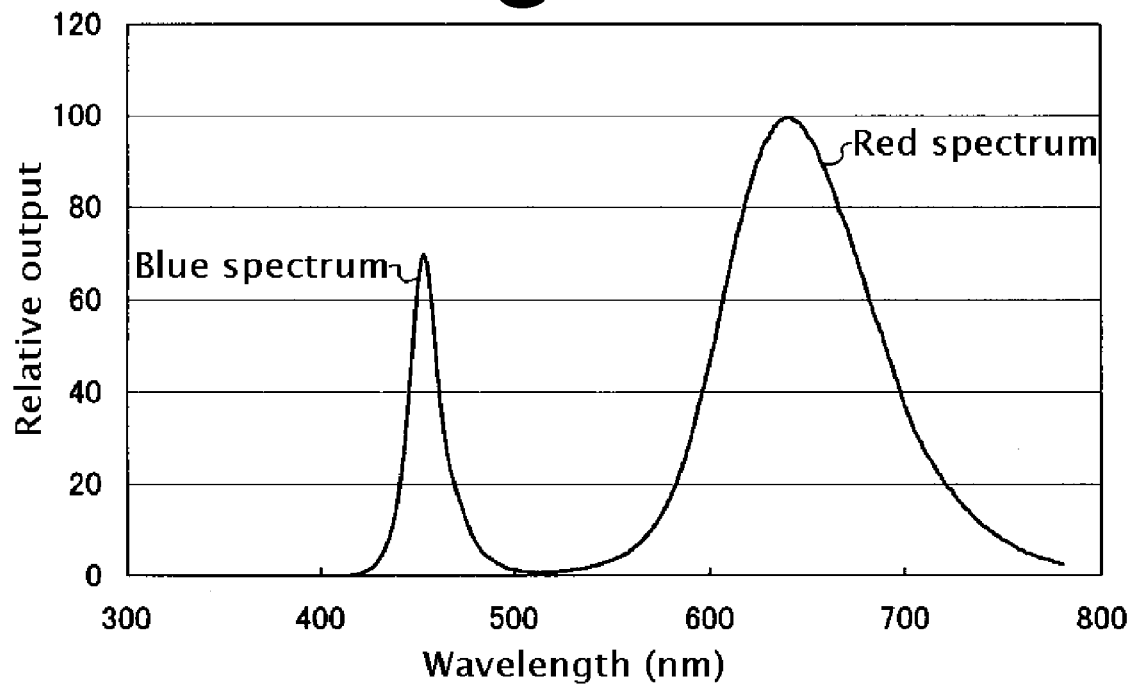
FIG. 10 is an exemplary spectrum for an LED lamp made in accordance with principles of the presently disclosed subject matter.
Figure 11:
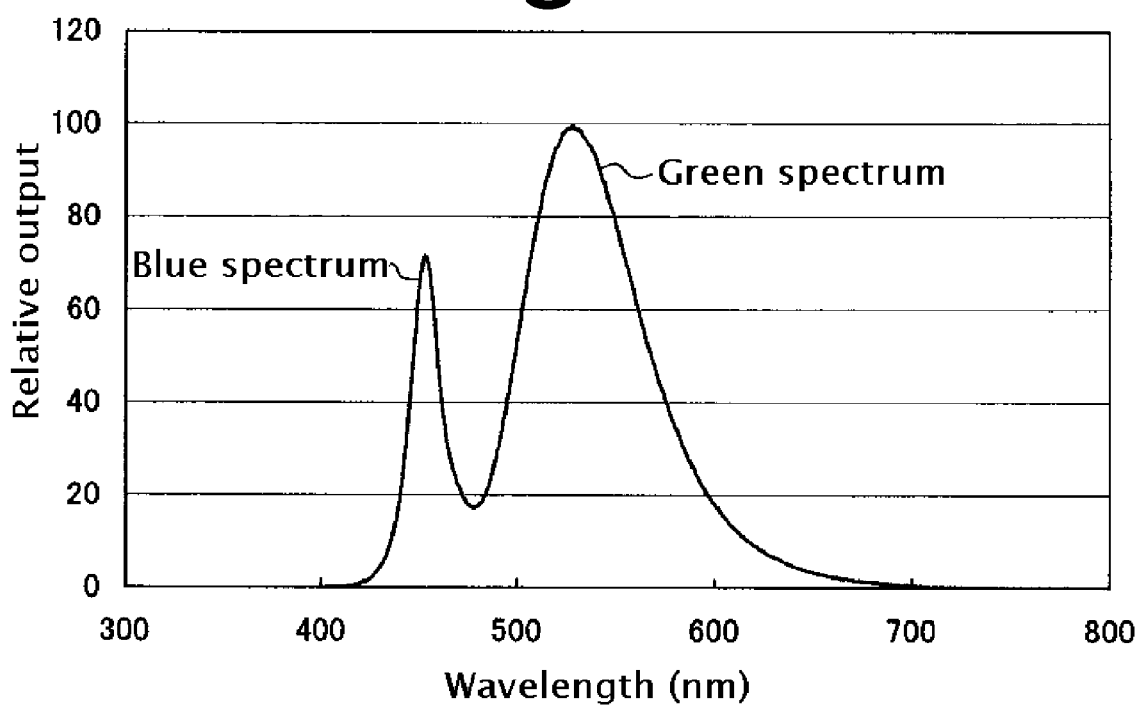
FIG. 11 is another exemplary spectrum associated with another example of an LED lamp made in accordance with principles of the presently disclosed subject matter.

Specifically, the bluish green LED lamp 1a has a spectrum as shown in FIG. 10 while the purple LED lamp 1b has a spectrum as shown in FIG. 11. Accordingly, the white light that is produced may contain the blue wavelength components from both the bluish green light of the bluish green LED lamp 1a and from the purple light of the purple LED lamp 1b, by overlaying them.

In the present exemplary embodiment, the relative output of the blue wavelength component is adjusted to be 70% of the output of the other wavelength component (which is a green wavelength component when it is bluish green light, and a red wavelength component when it is purple light) in each of the bluish green light from the bluish green LED lamp 1a and the purple light from the purple LED lamp 1b. Furthermore, in the present exemplary embodiment, the intensity ratio between both of the blue wavelength components can be substantially or exactly 1, i.e., the intensity of the components can be set to be almost or exactly equal to each other.

In the conventional techniques, in some cases, the relative output of the blue wavelength component contained in white light may drastically increase with respect to respective outputs of red and green wavelength components. Furthermore, this may result in an improper intensity ratio between the red, green, and blue wavelength components. This may generate non-uniform intensity as well as result in a color tone shift. The white LED light source device 6 including the bluish green LED lamp 1a and the purple LED lamp 1b can produce white light with improved luminous intensity and uniform color tone.

Figure 12:
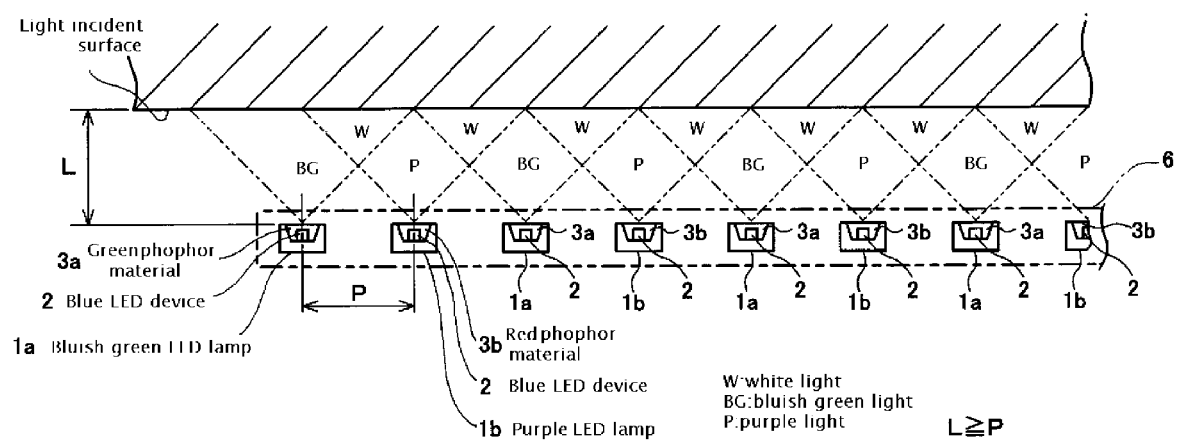
FIG. 12 is a diagram illustrating an example of how colors can be mixed in a white LED light source device made in accordance with principles of the presently disclosed subject matter.

FIG. 12 is a diagram illustrating how the colors are mixed in the white LED light source device 6 in which a plurality of bluish green LED lamps 1a and a plurality of purple LED lamps 1b are alternately arranged. In this drawing, the divergence (half angle) of each of the bluish green LED lamp 1a and the purple LED lamp 1b which constitute the white LED light source device 6 is set to ±45°, so as to direct the light from the white LED light source device 6 to the surface to be irradiated.

In this instance, specific conditions should be satisfied in order to allow the LED light source device 6 to irradiate the surface with white light produced by the additive color mixture of bluish green light from the lamp 1a and purple light from the lamp 1b with sufficient luminous intensity and uniform color tone. Namely, the condition of L≧P should be satisfied, wherein L is the distance between the light emitting surface of the LED lamps and the surface to be irradiated, and P is the pitch between adjacent LED lamps.

Figure 13:
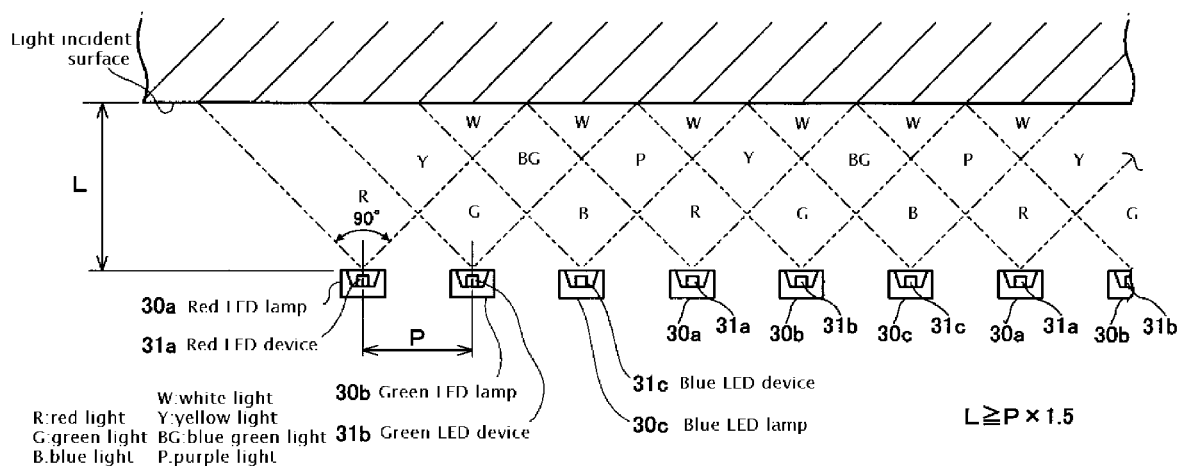
FIG. 13 is a diagram illustrating how colors are mixed in a conventional exemplary white LED light source device.

FIG. 13 shows the conventional white LED light source device including red LED lamps 30a, green LED lamps 30b, and blue LED lamps 30c arranged alternately (each LED lamp has a divergence of ±45°). In order to irradiate the surface with white light produced by the additive color mixture of three colors using this device with sufficient luminous intensity and uniform color tone, it may be required to satisfy the condition of L≧P×1.5 wherein L is the distance between the light emitting surface of the LED lamps and the surface to be irradiated, and P is the pitch between adjacent LED lamps.

Accordingly, the disclosed exemplary white LED light source device can irradiate the surface with white light with favorable color mixture and at a nearer position when compared with the conventional white LED light source device including three different colored LED lamps. In other words, the apparatus incorporating the disclosed exemplary LED light source device can be miniaturized to a greater degree than the conventional devices.

Figure 14:
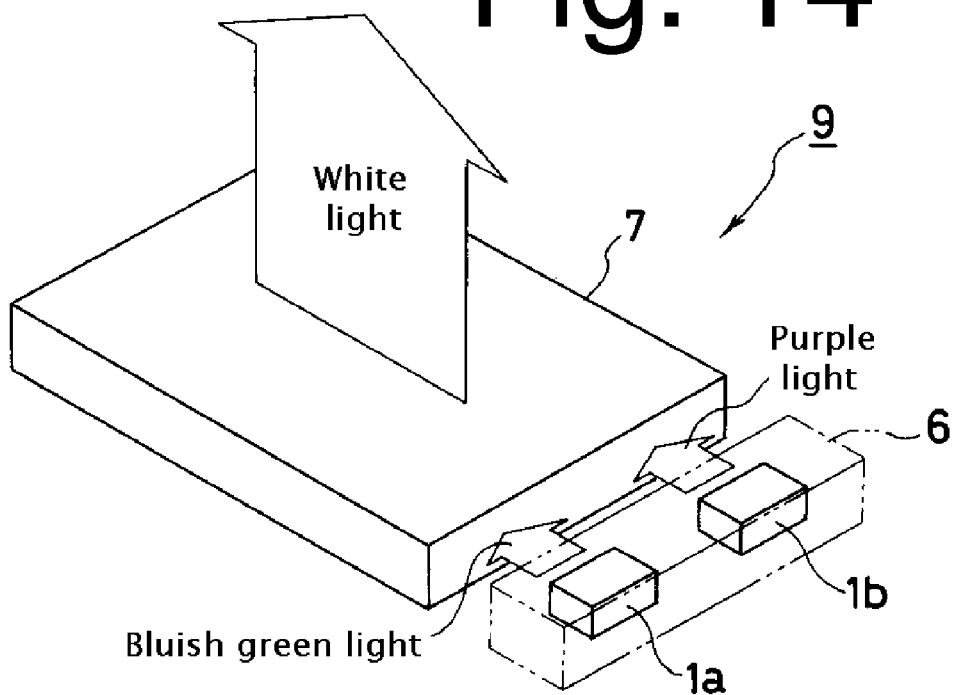
FIG. 14 is a conceptual diagram illustrating an example of an LED backlight employing a white LED light source device made in accordance with principles of the presently disclosed subject matter.
Figure 15:
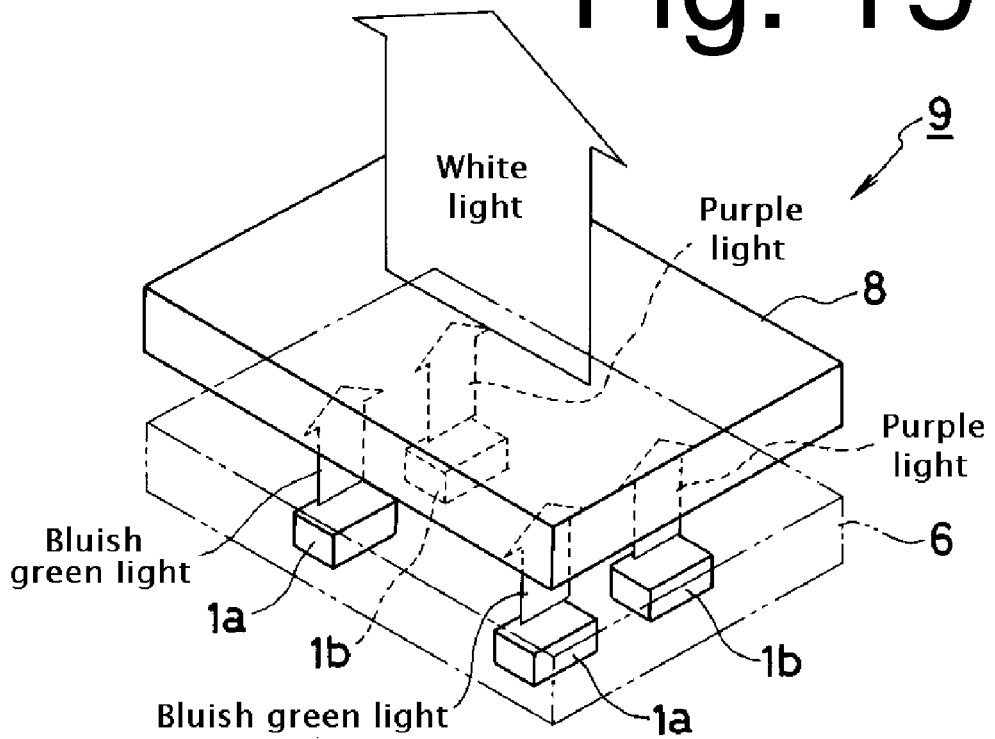
FIG. 15 is a conceptual diagram illustrating another example of an LED backlight employing a white LED light source device made in accordance with principles of the presently disclosed subject matter.

FIG. 14 shows an example of an LED backlight 9 made in accordance with principles of the presently disclosed subject matter, which includes a light guide plate 7 and the white LED light source device 6 including the bluish green LED lamp 1a emitting bluish green light and the purple LED lamp 1b emitting purple light. FIG. 15 shows another example of an LED backlight 9 made in accordance with principles of the presently disclosed subject matter, which includes a light diffusion plate 8 and the white LED light source device 6. As discussed above, in the LED backlight 9 shown in FIG. 14, the distance between the light emitting surfaces of the bluish green LED lamp 1a and the purple light LED lamp 1b and the light incident surface of the light guide plate 7 is set to be equal to the distance P between adjacent LED lamps. The same setting can be applied to the LED backlight 9 shown in FIG. 15 (refer to the relationship described with reference to FIG. 12).

By this configuration, white light with sufficient luminous intensity, uniform color tone, and favorable color mixture is produced at the position of the incident surface of the light guide plate 7 or the diffusion plate 8, is then guided through the light guide plate 7 or the diffusion plate 8, and is emitted from the light emitting surface of the light guide plate 7 or the diffusion plate 8.

As discussed above, the white LED light source device can be configured to include bluish green LED lamps and purple LED lamps, wherein the bluish green LED lamp can emit bluish green light by the combination of a blue LED device and a green phosphor material and the purple LED lamp can emit purple light by the combination of a blue LED device and a red phosphor material. Accordingly, the white LED light source device can emit white light by the additive color mixture of bluish green light and purple light.

In this instance, the green phosphor material is excited by the blue light from the blue LED device to wavelength convert the light, thereby generating bluish green light. The resulting bluish green light cannot be absorbed by the red phosphor material (re-wavelength conversion), thereby improving the utilization efficiency of the blue light from the blue LED device. In accordance with the experimental result, the output of light from the exemplary white LED light source device can be increased by 40% or more when compared with the conventional white LED lamp which produces white light by the combination of a blue LED device with green phosphor material and red phosphor material within the same system.

Furthermore, the disclosed exemplary white LED light source device can produce white light having three primary color wavelength components of red, green, and blue light in its spectrum with a favorable ratio. When this white LED light source device is used as a light source for an LED backlight and a projector, a wide range of color reproduction characteristics can be achieved, and possibly 1.5 times as wide as the NTSC ratio obtained by the conventional white LED light source device which uses the combination of a blue LED device and a yellow phosphor material.

Furthermore, the light path for generating the white light with less color tone shift and with favorable color mixture by mixing the light of different color tones from the respective LED lamps can be shortened as compared to the conventional white LED light source device which generates white light with the use of three colored LED lamps (by ⅔ of the conventional path length). This facilitates the miniaturization of the apparatus.

Figure 16:
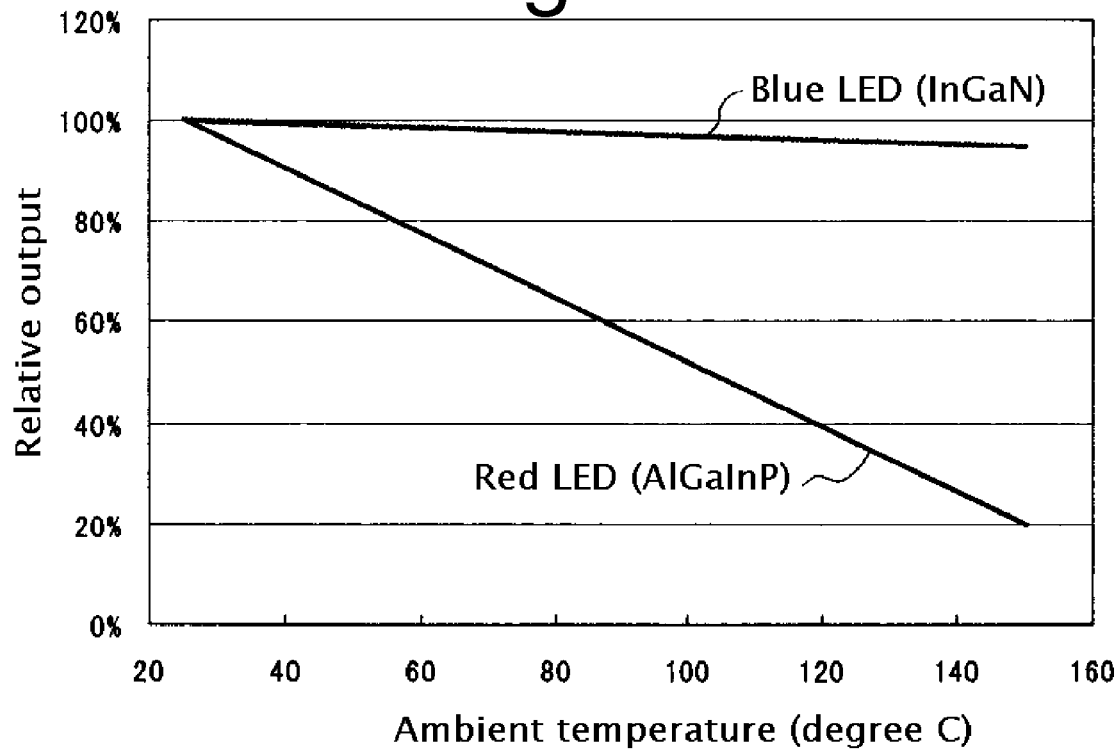
FIG. 16 is a graph showing the relationship between the ambient temperature and the relative output of a blue LED device and a red LED device.
Figure 17:
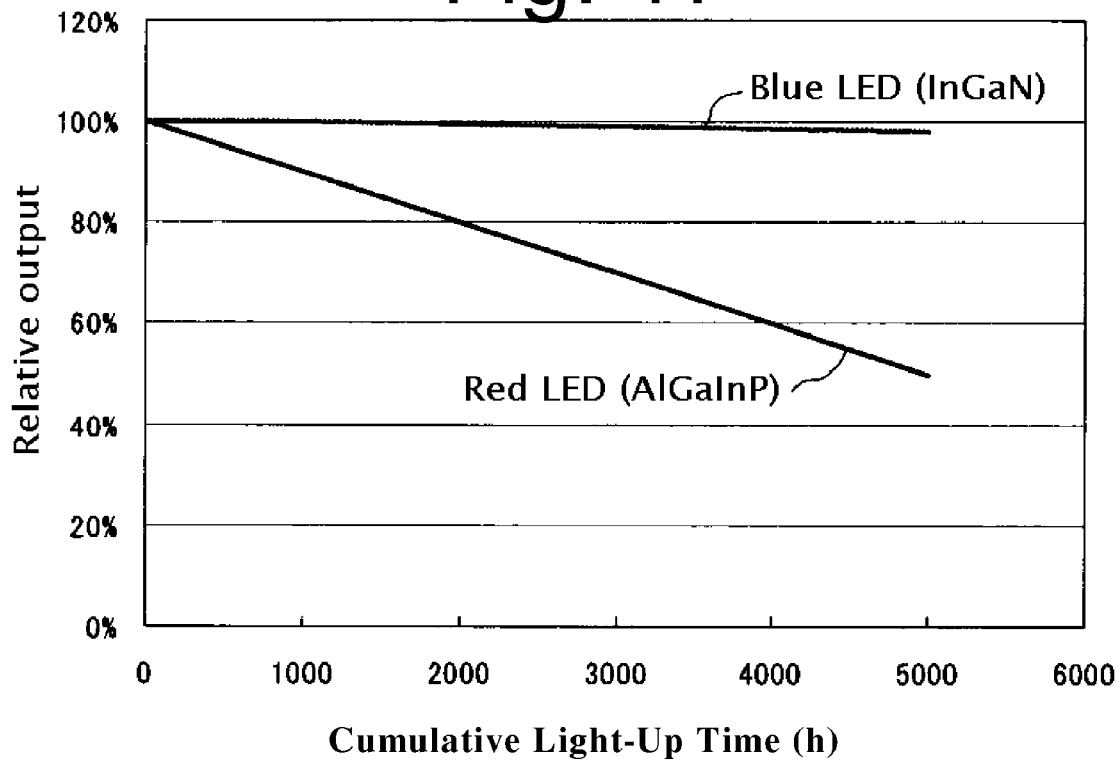
FIG. 17 is a graph showing the relationship between the cumulative light-up time and the relative output of a blue LED device and a red LED device.

FIG. 16 shows the relationship between the ambient temperature and the relative output of a blue LED device formed of InGaN and a red LED device formed of AlGaInP. FIG. 17 shows the relationship between the cumulative light-up time and the relative output. As clearly shown in these graphs, the blue LED device has the output performance where the output deterioration due to temperature rise as well as due to cumulative light-up time is less as compared with the red LED device.

A white LED light source device made in accordance with principles of the presently disclosed subject matter can use a blue LED device in both the bluish green LED lamp and the purple LED lamp. As a result, the white LED light source device can produce white light with less variation of intensity and color tone which variation can result due to ambient temperature variation and cumulative light-up time.

It will be apparent to those skilled in the art that various modifications and variations can be made in the presently disclosed subject matter without departing from the spirit or scope of the invention. Thus, it is intended that the present invention cover the modifications and variations of this disclosed subject matter provided they come within the scope of the appended claims and their equivalents. All related and conventional art references described above are hereby incorporated in their entirety by reference.

What is claimed is:

1. A white LED light source device comprising:
   a bluish green LED lamp configured to emit bluish green light; and
   a purple LED lamp configured to emit purple light, wherein the bluish green LED lamp and the purple LED lamp are configured to subject the bluish green light and the purple light to color mixture to produce white light that has a spectrum containing three primary color wavelength components of red, green, and blue light.

2. The white LED light source device according to claim 1, wherein the bluish green LED lamp includes a blue LED device configured to emit blue light having a peak wavelength in a wavelength range of blue color and a green wavelength conversion material configured to be excited by the blue light to emit green light having a peak wavelength in a wavelength range of green color.

3. The white LED light source device according to claim 1, wherein the purple LED lamp includes a blue LED device configured to emit blue light having a peak wavelength in a wavelength range of blue color and a red wavelength conversion material configured to be excited by the blue light to emit red light having a peak wavelength in a wavelength range of red color.

4. The white LED light source device according to claim 2, wherein the purple LED lamp includes a blue LED device configured to emit blue light having a peak wavelength in a wavelength range of blue color and a red wavelength conversion material configured to be excited by the blue light to emit red light having a peak wavelength in a wavelength range of red color.

5. The white LED light source device according to claim 2, wherein the green wavelength conversion material is a green phosphor material.

6. The white LED light source device according to claim 3, wherein the red wavelength conversion material is a red phosphor material.

7. The white LED light source device according to claim 4, wherein the green wavelength conversion material is a green phosphor material, and the red wavelength conversion material is a red phosphor material.

8. An LED backlight including a white LED light source device comprising:
   a bluish green LED lamp configured to emit bluish green light; and
   a purple LED lamp configured to emit purple light, wherein the bluish green LED lamp and the purple LED lamp are configured to subject the bluish green light and the purple light to color mixture to produce white light that has a spectrum containing three primary color wavelength components of red, green, and blue light.

9. The LED backlight according to claim 8, wherein the bluish green LED lamp includes a blue LED device configured to emit blue light having a peak wavelength in a wavelength range of blue color and a green wavelength conversion material configured to be excited by the blue light to emit green light having a peak wavelength in a wavelength range of green color.

10. The LED backlight according to claim 8, wherein the purple LED lamp includes a blue LED device configured to emit blue light having a peak wavelength in a wavelength range of blue color and a red wavelength conversion material configured to be excited by the blue light to emit red light having a peak wavelength in a wavelength range of red color.

11. The LED backlight according to claim 9, wherein the purple LED lamp includes a blue LED device configured to emit blue light having a peak wavelength in a wavelength range of blue color and a red wavelength conversion material configured to be excited by the blue light to emit red light having a peak wavelength in a wavelength range of red color.

12. The LED backlight according to claim 9, wherein the green wavelength conversion material is a green phosphor material.

13. The LED backlight according to claim 10, wherein the red wavelength conversion material is a red phosphor material.

14. The LED backlight according to claim 11, wherein the green wavelength conversion material is a green phosphor material, and the red wavelength conversion material is a red phosphor material.

15. The LED backlight according to claim 8, further comprising:
    a diffusion plate located adjacent the white LED light source device.

16. The LED backlight according to claim 15, wherein the diffusion plate includes a first side configured to receive light from the white LED light source device and a second side opposing the first side and configured to emit the white light therefrom, the light from the white LED light source device being emitted along an axis substantially parallel to an axis of emission of the white light emitted from the second side of the diffusion plate.

17. The LED backlight according to claim 8, further comprising:
    a light guide plate located adjacent the white LED light source device.

18. The LED backlight according to claim 17, wherein the light guide plate includes a first side configured to receive light from the white LED light source device and a second side substantially perpendicular to the first side and configured to emit the white light therefrom.

19. The white LED light source device of claim 1, further comprising:
    a housing that includes a window, wherein the bluish green LED lamp and the purple LED lamp are located in the housing and configured such that respective bluish green light and purple light are emitted through the window of the housing to create white light.

20. The white LED light source device of claim 19, further comprising:
    at least one of a light diffusing plate and a light guide plate located adjacent the window of the housing.

* * * * *